UNITED STATES PATENT OFFICE.

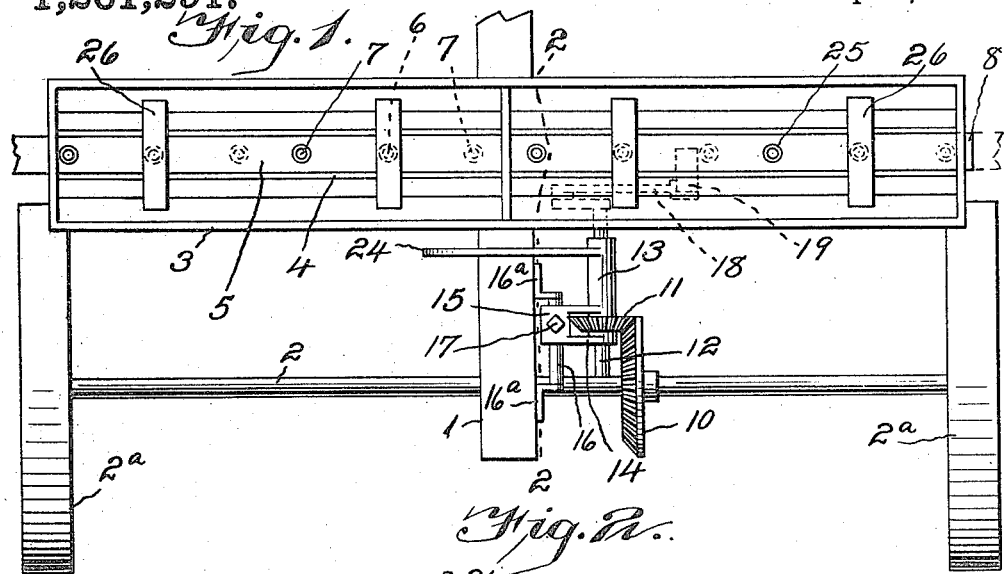
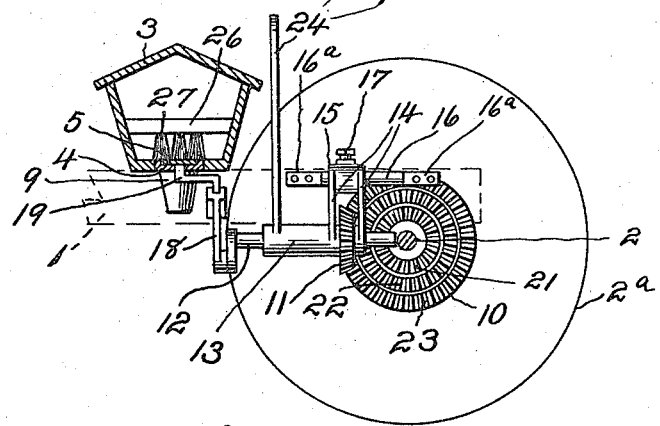
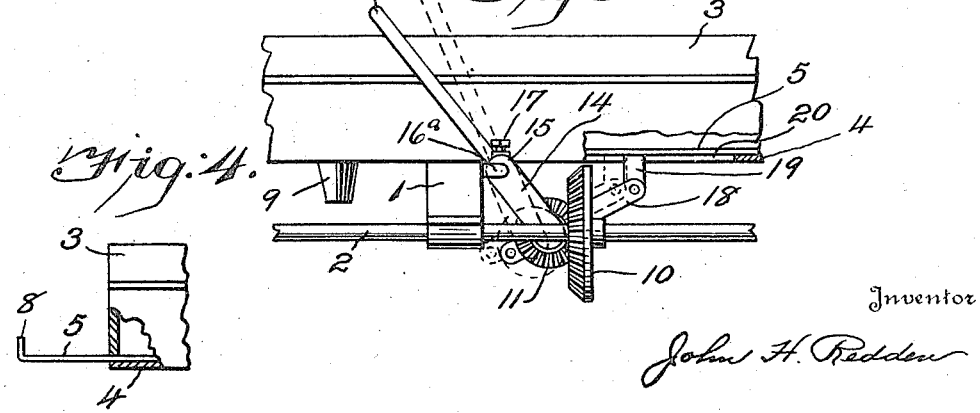

JOHN H. REDDEN, OF OGDEN, UTAH.

SEED-PLANTER.

1,261,291.  Specification of Letters Patent.  Patented Apr. 2, 1918.

Application filed February 1, 1917. Serial No. 145,922.

*To all whom it may concern:*

Be it known that I, JOHN H. REDDEN, a citizen of the United States, residing at Ogden, in the county of Weber and State of Utah, have invented certain new and useful Improvements in Seed-Planters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in seeding or seed-planting machines.

The invention has for its object to provide for controlling the seed-dropping operation, as in planting or depositing the seed in the ground, more particularly in varying the spacing apart of the dropping of the seed; the regulating of the dropping of the number of seed at each interval; and providing for the dropping of seed of different sizes. Primarily the invention has in view to greatly lessen the waste usually attendant upon the planting or dropping of the seed, also to eliminate the cost of thinning out the young plants with respect to the spacing of the same.

Other objects as well as the nature, characteristic features and scope of the invention will be more readily appreciated from the following description taken in connection with the accompanying drawing, and in which latter—

Figure 1 is a plan view of my invention.

Fig. 2 is a sectional view thereof taken on the line 2—2 of Fig. 1.

Fig. 3 is a somewhat enlarged detailed side elevation of the device, parts being broken away.

Fig. 4 is a partly sectional and partly side fragmental view of the seed box or receptacle.

In carrying out my invention I suitably mount upon a frame 1 borne, as usual, by an axle 2 and carrying wheels 2ª, a seed hopper or receptacle 3 equipped with seed dropping means, in the present instance, including a fixed longitudinal bar 4 constituting partly the bottom of the seed box or receptacle, and a similar longitudinally slidable bar 5 positioned within the aforesaid fixed bar, the latter being recessed in its upper surface for the reception of the slidable bar or member. The bars or members 4 and 5 are each provided with a plurality of seed receiving and dropping openings 6 and 7, respectively, arranged at predetermined intervals apart as seen in Fig. 1. The slidable bar or member 5 has at each end an upstanding lug or jarrer 8, adapted, as the slide or member 5, is actuated, to strike against the ends of the receptable or against the supporting frame, and thus provide for jarring the seed down through the seed-dropping openings of the members 4 and 5, the seed then passing into, and being conducted by the chutes 9 to the ground, the chutes being suitably applied or secured to the box or receptable in alinement with said seed-openings, as well understood.

Upon the wheel axle or shaft 2 is suitably secured or carried a bevel gear wheel 10 with which is geared or meshed a bevel pinion or gear-wheel 11 carried by a crank-shaft 12 supported or carried by a tubular or hollow member or sleeve 13. The sleeve member 13, which is adapted as seen in Figs. 1 and 2, to receive the pinion 11 in fixing the latter to the shaft 12, has connection by means of arm 14 with a short tubular member or sleeve 15, said arms being integral with said sleeves, the two sleeves and arms thus constituting an entirety or single casting and which may be termed as a hanger. The hanger has its upper sleeve 15, slidably mounted upon the rod-member 16 of a bracket 16ª said bracket including right-angled end-members secured to the planter-frame to provide for spacing off the rod-member from the frame, whereby clearance may result for providing for the sliding or moving the hanger therealong in effecting the hereinafter mentioned adjustment of parts. The sleeve 15 of the hanger is equipped with a set or holding screw 17 for the retention thereof at the desired point of adjustment as will be more fully appreciated later.

The crank-shaft 12 has link-connection 18 with the slidable seed-dropping member 5, the latter having a pendent stud 19 depending therefrom, through a longitudinal slot 20 in the fixed seed-dropping bar or member 4 and to this stud 19 is pivoted one end of the link 18 of the crank-shaft 12. The gear-wheel 10 has a plurality of concentric circular arrangement of teeth or cogs 21, 22, 23, upon its face with any one of which circular arrangement of teeth or cogs may be brought into gear or mesh the pinion or wheel 11, as will be seen by accordingly moving or adjusting the sleeve 13, provided with a fixed lever 24 for that purpose, whereby, by effecting such meshing action between said pinion or gear wheel and said arrangement of teeth, it is obvious that the sliding bar 5 may be moved so as to position its openings at varying intervals with respect to the openings of the bar 4 and thus provide for the dropping of the seed at varying or different intervals apart in the ground, during the seed-planting operation. The openings in the slidable bar 5 may be varied in diameter or cross-section, if desired, and thus provide for dropping or planting different sized seed, by positioning in said openings annuli or rings 25 particularly as seen in Fig. 1. In the seed box or receptacle 3 are arranged and suitably held as by transverse top-forming pieces 26, suitable brushes or fibrous material 27, to provide for the guarding or clearance of the entrance of the seed-receiving openings of the slidable bar 5 accordingly preventing the overcrowding of said openings and the otherwise wasting of the seed, as is experienced in the usual contrivances for that purpose.

In effecting the relative adjustment of the pinions or gears 10 and 11, as in changing the spacing of the dropping of the seed, it will be observed that the shaft-sleeve 13 is laterally rocked upon the shaft 12 by suitably moving the lever 24 inwardly as indicated in dotted lines in Fig. 3 suitably moving the pinion 11 laterally away from the cog-arrangement 21, sufficiently to take the said pinion out of engagement with the latter and then moving the lever so as to slide the sleeve 13 endwise along the shaft 12 bringing the pinion 11 in opposition to the desired circle of cogs, the set-screw 17 then being tightened, while the weight of the lever 24, when released, will automatically careen said lever outwardly in a direction away from the face of the gear or pinion 10 as indicated in full lines in Fig. 3, serving to automatically or by gravity, effect the intergearing action between the pinions and so retain such action without further aid.

I claim:

1. A seed-planter, including a hopper equipped with a fixed member and a longitudinally slidable member thereon, each of the latter members being provided with a plurality of seed-dropping openings, and means for transmitting a longitudinally reciprocating movement to the upper dropping members, comprising intergeared mechanism, a crank or cam shaft actuating said slidable dropping member, a slidable sleeve upon said crank shaft, equipped with a pinion of said intergeared mechanism and adapted to shift said pinion into and out of gear, said pinion-equipped sleeve, itself, being carried by a slidable sleeve having means for its retention in fixed position, the first referred-to sleeve being provided with a lever for effecting its shifting action.

2. A seed-planter, including a hopper having a dropping mechanism, in combination with a gear secured upon the drive-wheel axle, having a plurality of circular arrangements of cogs, a pinion meshing with the aforesaid gear, a crank-shaft carrying the second referred to pinion and coöperating with said dropping mechanism, a hanger, including a tubular member having said crank-shaft mounted therein and connected to a second tubular member slidably supported in position and provided with means for its retention in fixed position, said first referred to tubular member being rockable with respect to the first referred to gear and endwise movable upon said crank-shaft.

3. A seed-planter, including a hopper equipped with a dropping mechanism in combination with a gear secured upon the drive-wheel axle, having a plurality of circular arrangements of cogs or teeth, a pinion meshing with the aforesaid gear, a crank-shaft carrying the second referred to pinion and a hanger comprising a tubular member having said crank-shaft mounted therein and a second tubular member connected to the aforesaid tubular member and slidably mounted in position upon a spaced-off rod of a bracket fixed to the planter-frame, means effecting connection between said second tubular member and said bracket, the aforesaid tubular member having a gravity actuated lever for automatically throwing the second referred to pinion into gear with the first referred to gear wheel and whereby the aforesaid tubular member with its pinion may be moved laterally away from and toward said circular arrangement of cogs or teeth.

In testimony whereof, I affix my signature, in presence of two witnesses.

JOHN H. REDDEN.

Witnesses:
W. R. SKEEN,
M. H. MANNING.